US009098179B2

(12) United States Patent
Sanoy

(10) Patent No.: US 9,098,179 B2
(45) Date of Patent: Aug. 4, 2015

(54) METHOD AND SYSTEM FOR INSERTING A CONTENT OBJECT FOR USE ON AN INTERACTIVE SURFACE

(75) Inventor: Cory Sanoy, Calgary (CA)

(73) Assignee: SMART Technologies ULC, Calgary (CA)

( * ) Notice: Subject to any disclaimer, the term of this patent is extended or adjusted under 35 U.S.C. 154(b) by 1558 days.

(21) Appl. No.: 12/305,940

(22) PCT Filed: Apr. 17, 2007
(Under 37 CFR 1.47)

(86) PCT No.: PCT/CA2007/000622
§ 371 (c)(1),
(2), (4) Date: Apr. 14, 2011

(87) PCT Pub. No.: WO2007/118315
PCT Pub. Date: Oct. 25, 2007

(65) Prior Publication Data
US 2011/0252402 A1    Oct. 13, 2011

Related U.S. Application Data

(60) Provisional application No. 60/792,724, filed on Apr. 17, 2006.

(51) Int. Cl.
*G06F 9/44* (2006.01)
*G06F 3/0484* (2013.01)

(52) U.S. Cl.
CPC .............. *G06F 3/04845* (2013.01); *G06F 8/70* (2013.01)

(58) Field of Classification Search
USPC ....................................................... 717/120
See application file for complete search history.

(56) References Cited

U.S. PATENT DOCUMENTS

| | | | |
|---|---|---|---|
| 6,259,446 B1 * | 7/2001 | Matheny et al. | 715/764 |
| 6,263,492 B1 | 7/2001 | Fraley et al. | |
| 6,434,740 B1 * | 8/2002 | Monday et al. | 717/108 |
| 6,453,328 B1 * | 9/2002 | Schaeffer et al. | 715/202 |
| 6,604,196 B1 * | 8/2003 | Monday et al. | 713/100 |
| 6,714,219 B2 * | 3/2004 | Lindhorst et al. | 715/769 |
| 6,889,113 B2 | 5/2005 | Tasker et al. | |

(Continued)

FOREIGN PATENT DOCUMENTS

| EP | 1 426 857 A1 | 6/2004 |
|---|---|---|
| EP | 1426857 A1 * | 6/2004 |

(Continued)

OTHER PUBLICATIONS

Jan. 8, 2010 People's Republic of China Office Action for Chinese Application No. 200780013931.3.
Office Action for Mexican National Phase Application No. Mx/a/2008/013415.
Apr. 21, 2010 Examination Report for New Zealand Patent Application No. 571859.

(Continued)

*Primary Examiner* — Don Wong
*Assistant Examiner* — Roberto E Luna
(74) *Attorney, Agent, or Firm* — Katten Muchin Rosenman LLP

(57) ABSTRACT

A method of enhancing features in a computing environment wherein a software application comprising compiled source code is executed, the method comprising inserting at least one content object into a canvas page of the software application. Each content object comprises code defining functionality attributed to the content object. The content object code is executed in response to interaction with the content object thereby to supplement host software application functionality with the attributed functionality.

30 Claims, 10 Drawing Sheets

(56) References Cited

U.S. PATENT DOCUMENTS

| | | | |
|---|---|---|---|
| 6,948,120 B1* | 9/2005 | Delgobbo et al. | 717/115 |
| 6,954,197 B2 | 10/2005 | Morrison et al. | |
| 8,694,953 B2* | 4/2014 | Khodabandehloo et al. | 717/105 |
| 2003/0035009 A1* | 2/2003 | Kodosky et al. | 345/771 |
| 2005/0188294 A1* | 8/2005 | Kuchinsky et al. | 715/500 |
| 2006/0055670 A1* | 3/2006 | Castrucci | 345/157 |
| 2011/0016448 A1* | 1/2011 | Bauder et al. | 717/104 |

FOREIGN PATENT DOCUMENTS

| | | |
|---|---|---|
| WO | 99/56205 A1 | 11/1999 |
| WO | 03/052626 A1 | 6/2003 |
| WO | WO 03052626 A1 * | 6/2003 |

OTHER PUBLICATIONS

International Search Report for International Application No. PCT/CA2007/000622.

Supplementary European Search Report for Europen Application No. EP 07 71 9549.

Smart (TM): Extraordinary made simple—Smart Notebook Software Learner Resource, Printed in Canada Jun. 2008, Smart Technologies ULC, available online at <http://downloads01.smarttech.com/media/trainingcenter/nb_basics_learning_resource.pdf> retrieved on Apr. 15, 2010.

International Preliminary Report on Patentability and the Written Opinion of the International Searching Authority for International Application No. PCT/CA2007/000622.

* cited by examiner

METHOD AND SYSTEM FOR INSERTING A CONTENT OBJECT FOR USE ON AN INTERACTIVE SURFACE

CROSS-REFERENCE TO RELATED APPLICATIONS

This application claims the benefit of U.S. Provisional Application No. 60/792,724 filed on Apr. 17, 2006, the content of which is incorporated by reference.

FIELD OF THE INVENTION

The present invention relates generally to information display and in particular to a method of enhancing software application features and to content objects.

BACKGROUND OF THE INVENTION

Most software applications have well defined functionality that is written directly into the source code of the software applications. As a result, the functionality of the software applications is fixed once the source code is compiled and the executable software applications are deployed. If the functionality of such a software application is to be changed or if new functionality is to be added to the software application, the software application source code must be modified to incorporate the functionality changes or additions. Once modified, the source code must be re-compiled and the executable software application re-deployed. As will be appreciated, this makes the functionality of such a software application very rigid and almost impossible to change without considerable expense, once the software application source code has been compiled and the executable software application deployed. Also, modifying the source code to incorporate functionality changes or additions requires significant programming skill.

For example, drag and drop functionality in software applications is common and well known to those of skill in the art. Such functionality is typically implemented in the software application source code. The software application source code defines the types of resource objects that the software application will accept as valid drag and drop inputs and inhibits undefined and thus invalid, resource objects from being accepted. The resource object type definitions apply to the entire software application. The software application source code includes software routines compiled into libraries that handle the resource objects when they are dragged and dropped on the software application. Unfortunately, once the software application source code has been compiled and the executable software application deployed, the behavior of the software application is fixed and the drag and drop handling routines cannot be changed. New valid drag and drop resource objects cannot be defined unless the software application source code is modified and recompiled as discussed above. Similarly existing drag and drop resource objects cannot be changed to invalid drag and drop resource objects without modifying and recompiling the software application source code. The end result is a very static software application.

The above rigidity in software applications poses other problems. For example, software applications are generally targeted at well known groups of end users whose needs are believed to be mostly known when the software applications are being designed. If end users have different needs, then typically only functionality that is common to all end users is implemented. The end result is software applications that lack functionality desired by many end users and that lack variability in functionality.

This inflexibility in functionality is particularly problematic in application content authoring and presentation environments. Content features need to be more dynamic than software application features as content features must suit the needs of each individual piece of content rather than applying globally to a user base. In other words, content features are targeted at individual pieces of content within a software application rather than at the end users. Notwithstanding the above, typically when a new content feature is conceived, it is judged based on user demand and implemented based on the lowest common denominator of functionality. Content features that do not appeal to a large group are usually not implemented. Content features that are implemented unfortunately require rewriting and recompiling of the software application source code as described above. The end result is rigid and simplified content features.

As will be appreciated, there is exists a need for programming flexibility especially at the content level. It is therefore an object of the present invention to provide a novel method of enhancing software application features and novel content objects.

SUMMARY OF THE INVENTION

Accordingly, in one aspect there is provided a method of enhancing features in a computing environment wherein a software application comprising compiled source code is executed. The method comprises inserting at least one content object into a canvas page of the software application, each content object comprising code defining functionality attributed to the content object. The content object code is executed in response to interaction with the content object thereby to supplement software application functionality with the attributed functionality.

In one embodiment, the attributed functionality comprises functionality that is unavailable in the software application. The method further comprises creating each content object by selecting one of more functional components from a component library prior to the inserting. Each created content object is stored in a repository. During the inserting, each content object is dragged from the repository and dropped onto the canvas page. During the creating, selected components are dropped onto a content object creation page. The first selected component acts as a container component responsible for merging subsequently selected components forming the content object.

In one embodiment, the attributed functionality of the content object is altered subsequent to the inserting. The altering comprises conveying a message to the content object and executing the message thereby to alter the code. The inserted content object may be displayed on the canvas page within a window. The appearance of the window may be altered in response to interaction with the content object. The content object may create at least one new content object upon execution of the code and/or generate a message to one or more other content objects upon execution of the code. Alternatively the content object may execute the code in response to a resource object drop event made on the content object.

According to another aspect there is provided a content object to be inserted into a canvas page of a software application, the content object comprising at least one component associated with a content object function and comprising at least one routine, a handler executing the routine in response to interaction with the content object and a communication interface enabling communications between each the content object and the software application. The content object is created at runtime to supplement the functionality of the software application.

According to yet another aspect there is provided a method of adding features to a compiled software application comprising creating one or more content objects, each content object being insertable into the software application and having specified functionality, inserting one or more created content objects into the software application, and interacting with one or more of the inserted created content objects to invoke the functionality thereof within the software application.

As will be appreciated, the content objects provide content handling flexibility that when implemented do not require source code modification at the software application level. In this manner, different content handling features can be provided to different end users providing for dynamic content handling.

BRIEF DESCRIPTION OF THE DRAWINGS

Embodiments will now be described more fully with reference to the accompanying drawings in which.

DETAILED DESCRIPTION OF THE EMBODIMENTS

In the following description, various embodiments of content objects are discussed. The content objects are created by developers to provide content handling flexibility without requiring source code modification at the software application level. In this example, the content objects are created for an interactive input system environment although those of skill in the art will appreciate that the content objects may be used in virtually any computing environment where users interact with displayed content.

Figure 1:
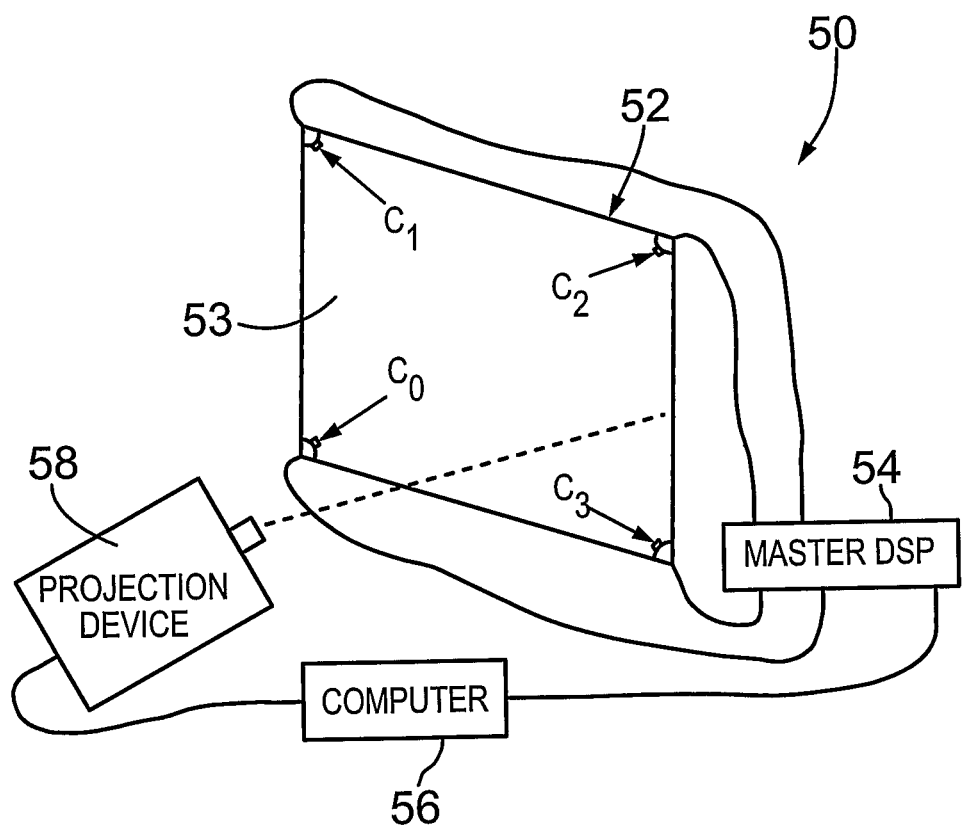
FIG. 1 is a schematic diagram of an interactive input system.

Turning now to FIG. 1, a camera-based interactive input system 50 of the type disclosed in U.S. Pat. No. 6,954,197 to Morrison et al., assigned to SMART Technologies Inc. of Calgary, Alberta, assignee of the subject application, is shown. Interactive input system 50 comprises a touch screen 52 that includes a touch surface 53 on which a computer generated image is presented. A rectangular bezel or frame surrounds the touch surface 53 and supports digital cameras $C_0$ to $C_3$ adjacent its corners. The digital cameras $C_0$ to $C_3$ have overlapping fields of view that encompass and look generally across the touch surface 53. The digital cameras acquire images looking across the touch surface 53 from different viewpoints. Images acquired by the digital cameras $C_0$ to $C_3$ are processed by on-board digital signal processors to determine if a pointer exists in the captured images. When it is determined that a pointer exists in the captured images, the digital signal processors convey pointer characteristic data to a master controller 54, which in turn processes the pointer characteristic data to determine the location of the pointer in (x,y)-coordinates relative to the touch surface 53 using triangulation. The pointer coordinate data is then conveyed to a computer 56 executing one or more application programs. The computer 56 uses the pointer coordinate data to update a computer-generated image. The updated computer-generated image is then conveyed to a front or rear projection device 58 for display on the touch surface 53. Pointer contacts on the touch surface 53 can therefore be recorded as writing or drawing or used to control execution of a host software application executed by the computer 56.

The computer 56 executes a host software application that provides a canvas page into which resource objects and content objects can be placed. The content objects provide content handling flexibility, to supplement or enhance the feature set of the host software application while avoiding the shortcomings associated with software applications as described previously. The host software application in this embodiment is that offered by SMART Technologies, Inc. of Calgary, Alberta under the name Notebook™.

In this embodiment, each content object comprises source code including one or more routines. The content object is published to a Flash or SWF file and is inserted into the canvas page of the host software application. The content object is thus used in concert with the foundational aggregation features in Notebook™. The content object source code is run in the context of an annotation and in this way, specific features can be employed through content objects without requiring modification of the host software application source code. The content object communicates with the host software application following a messaging protocol that brokers messages between the content object and the host software application and provides a mechanism for passing information and events between the host software application and the content object.

The source code within the content object makes use of the messaging protocol to communicate with the host software application. Messages received by the content object from the host software application are processed by the source code resulting in a change in the behavior of the content object. The content object may also return messages to the host software application. As a result, the content object acts as a small program that performs specialized processing. As will be appreciated, content objects with varying functionality are possible. For example, the source code may provide the content object with content specific drag and drop functionality, script functionality, content object messaging functionality, window control functionality and/or content object creation functionality. Those of skill in the art will however, appreciate that the above list of functionality is in no way intended to be limiting. Source code that provides the content object with other functionality can be employed.

Figure 2:
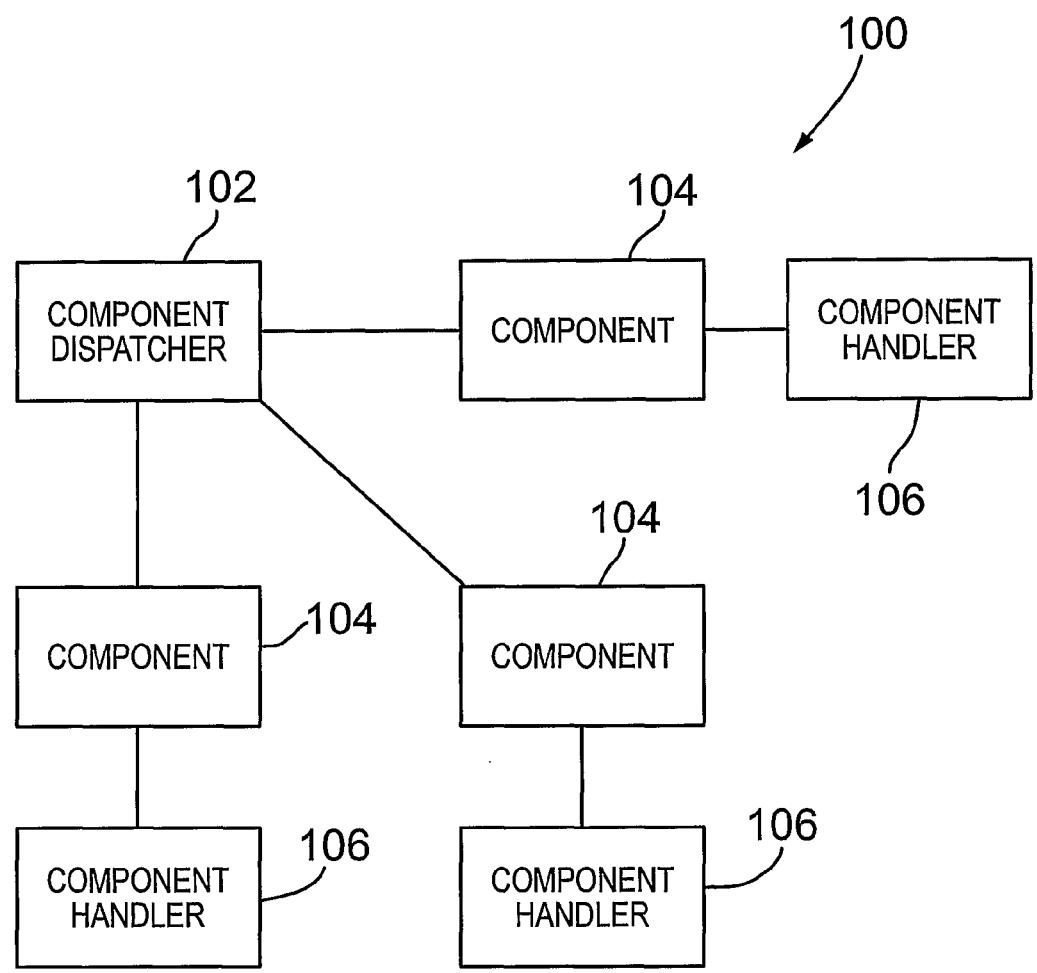
FIG. 2 is a block diagram of a content object.

An exemplary content object is shown in FIG. 2 and is generally identified by reference numeral 100. The content object 100 comprises a component dispatcher 102, one or more components 104 each comprising one or more source code routines, and a handler 106 for each component 104 that executes the component source code routines. The component dispatcher 102 acts as a communication interface between the components 104, the handlers 106 and the host software application. As the functionality of the content object is determined by the source code routines of the components 104, programming flexibility is achieved without requiring the source code of the underlying host software application to be modified simply by inserting content objects with the desired functionality into the host software application canvas page. Specific examples of content objects exhibiting a variety of functionality will now be described with reference to FIGS. 2 to 10.

As mentioned above, the source code may provide the content object with content specific drag and drop functionality. Drag and drop content specific objects extend the drag and drop functionality of a host software application by allowing the source code routines in the content objects to define the types of dragged and dropped resource objects that the content objects accept and how dropped and accepted resource objects are to be processed. In this manner, individual content objects are able to accept and process accepted resource objects in a manner specific to the individual content objects and are able to exhibit a specific behavior defined for each accepted resource object. For example, content objects can be created that accept ink resource objects, perform character recognition on the ink resource objects and display recognized text. Content objects can be created that accept files with a specific name or extension. Content objects can be created that accept text resource objects and scroll the text and that accept ink resource objects and perform recognition on the ink to convert the ink resource object to text before scrolling the text. The source of dragged and dropped resource object may vary. For example, the resource object may be dragged from a content gallery, the computer desktop, from another content object, from the clipboard, from a web page, etc.

Drag and Drop Sticky Content Object

Figure 3:
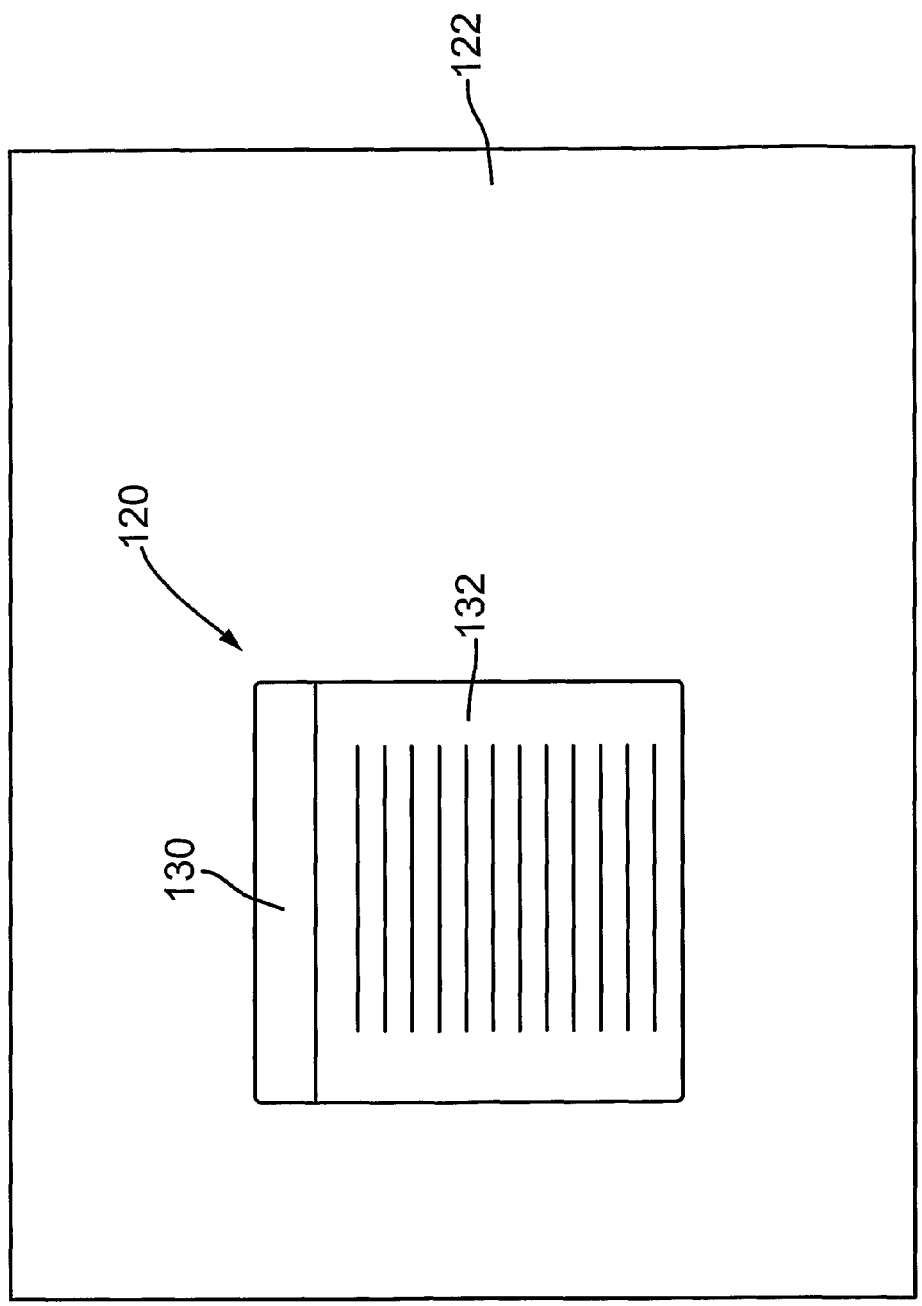
FIG. 3 shows a drag and drop content object displayed on a host software application canvas page.
Figure 4:
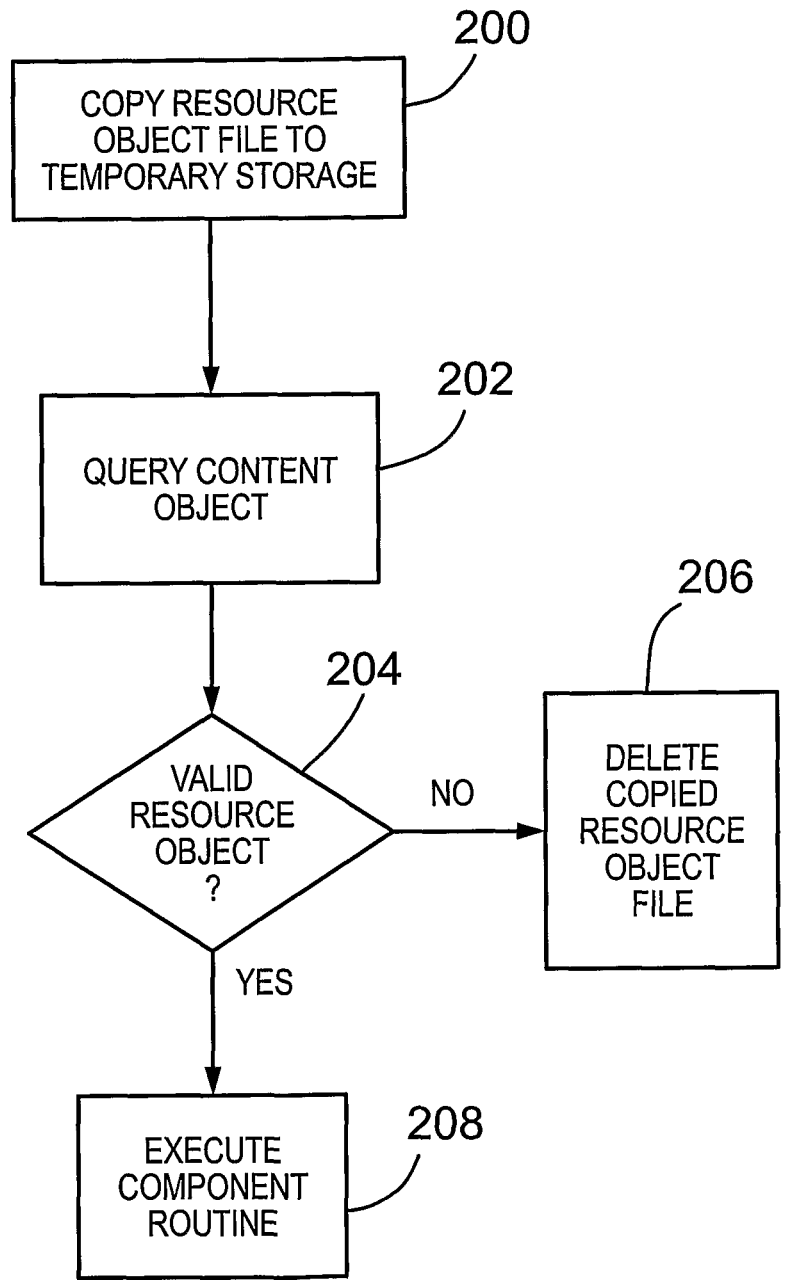
FIG. 4 is a flowchart showing the steps performed when a resource object is dragged and dropped onto the content object of FIG. 3.

Turning now to FIG. 3, a content object 120 inserted into the canvas page 122 of the host software application is shown. Content object 120 in this example is a drag and drop content specific "sticky" object that includes two components, namely a title bar component 130 and a lined canvas page component 132. The title bar component 130 comprises a routine that defines the types of resource objects the title bar component is able to accept and how such resource objects are to be handled if dragged and dropped onto the title bar component 130. In this example, the title bar component 130 accepts text and ink (path XML) resource objects. The lined canvas page component 132 also comprises a routine that defines the types of resource objects the lined canvas page component accepts and how such resource objects are to be handled if dragged and dropped onto the lined canvas page component 132. In this example, the lined canvas page component 132 accepts text, ink and graphic resource objects.

When a user drags and drops a resource object from the host software application into the content object 120, the host software application copies the file associated with the dragged and dropped resource object to the temporary file system of the computer 56 (step 200 in FIG. 4) and then sends a query message to the content object 120 identifying the type and location of the dropped resource object to determine if the dropped resource object can be handled by the component of the content object 120 into which the resource object was dropped (step 202). Upon receipt of the query message, the component dispatcher 102 forwards the query message to the appropriate component 104 of the content object 120 to validate the resource object type (step 204). If the resource object is of a type not supported by the component, the component 130 or 132 notifies the component dispatcher 102 which in turn, returns an unaccepted format flag to the host software application. In response to the unaccepted format flag, the host software application ignores the drag and drop event and deletes the file associated with the dragged and dropped resource object from the temporary file system (step 206). At step 204, if the resource object is determined to be of a type supported by the component 130 or 132, the component 104 notifies the component dispatcher 102 which in turn, returns an accepted flag to the host software application. The component handler 106 in turn executes the component routine(s) resulting in the dropped resource object being handled by the content object 120 in the appropriate manner (step 208).

In this example, if a text resource object is dragged and dropped into the title bar component 130 of the content object 120, execution of the title bar component routine by the component handler 106 results in the dropped text being wrapped within the content object 120 and displayed in the title bar component 130. If an ink resource object is dragged and dropped into the title bar component 130, execution of the title bar component routine by the component handler 106 results in the ink being converted into text and the resultant text being wrapped within the content specific object 120 and displayed in the title bar component 130. To achieve ink to text conversion, the component handler 106 instructs the host software application to perform the ink to text conversion and return the converted text to the content object 120. In this manner, the content object takes advantage of source code of the host software application thereby simplifying the content object source code.

If a text, ink or graphic resource object is dragged and dropped into the lined canvas page component 132, execution of the lined canvas page component routine by the component handler 106 results in the dropped object being wrapped within the content object and displayed on the lined canvas page component 132. As will be appreciated, the content object 120 allows resource objects to be injected ("stuck") therein and displayed. If a new valid resource object is dragged from the host software application and dropped onto the title bar component 130 or lined canvas page component 132, the new valid resource object is injected therein and displayed resulting in the previous resource object being overwritten.

Image Cloner Content Object

Figure 5:
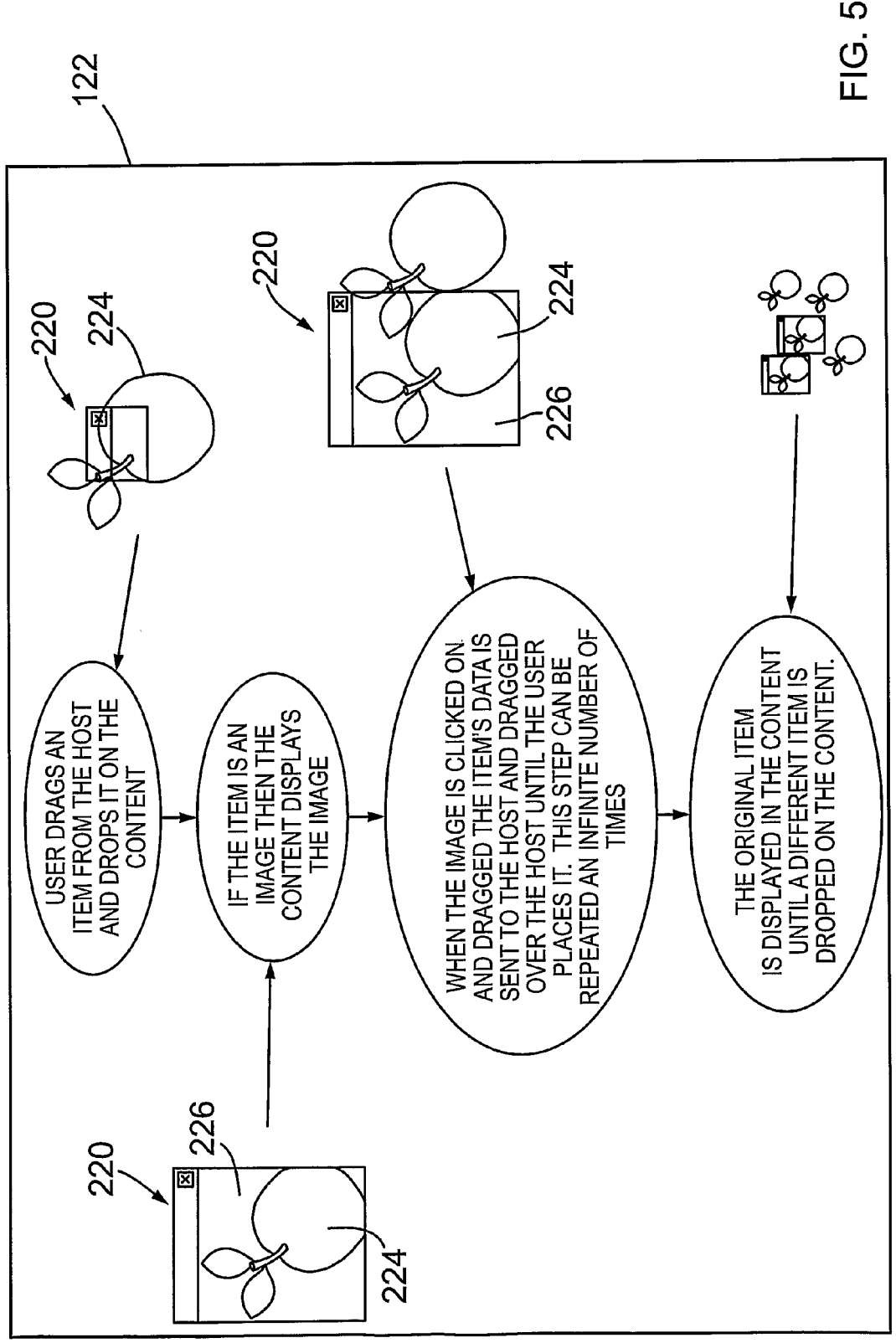
FIG. 5 is another drag and drop content object displayed on the host software application canvas page.

FIG. 5 shows another content object 220 inserted into the host software application and displayed on its canvas page 122. Content object 220 in this example is an image cloner that replicates resource objects and comprises a canvas page component 226. The routine associated with the canvas page component 226 accepts graphic resource objects. When a resource object 224 is dragged from the host software application and dropped into the canvas page component 226, the host software application stores the resource object file in the manner described previously and the resource object is wrapped into the content object 220 and displayed on the canvas page component 226. When the resource object displayed on the canvas page component 226 is dragged out of the content object and dropped onto the host software application canvas page 122, the component handler 106 executes the canvas page component routine.

Upon execution of the canvas page component routine, the component handler 106 initially computes the size and location of the dropped graphic resource object. The component handler 106 then creates an XML file comprising the code representing the dropped resource object. The XML file is then wrapped in appropriate XML tags The component handler 106 passes the XML file to the host software application via the component dispatcher 102 which in turn parses the XML file into it constituents, in this case the graphic resource object file. The host software application then saves the graphic resource object file to a file system directory and inserts the dropped graphic resource object into its canvas page 122 at the computed location. This happens whenever the resource object 224 displayed by the content object 220 is dragged out of the content object and dropped onto the host software application canvas page 122. The resource object remains displayed on the image cloner content object 220 until a new resource object is dragged from the host software application and dropped into the image cloner content object 220. When a new resource object is dropped into the content object 220 and the resource object file is saved by the host software application, the new resource object is wrapped in the content object thereby overwriting the previous resource object and the new resource object is displayed on the canvas page component 226.

As with the drag and drop sticky content object 120, if an unsupported resource object is dragged from the host software application and dropped onto the content object 220, the content object 220 notifies the host software application resulting in the drag and drop event being ignored by the image cloner content object.

Path Follower Content Object

Figure 6:
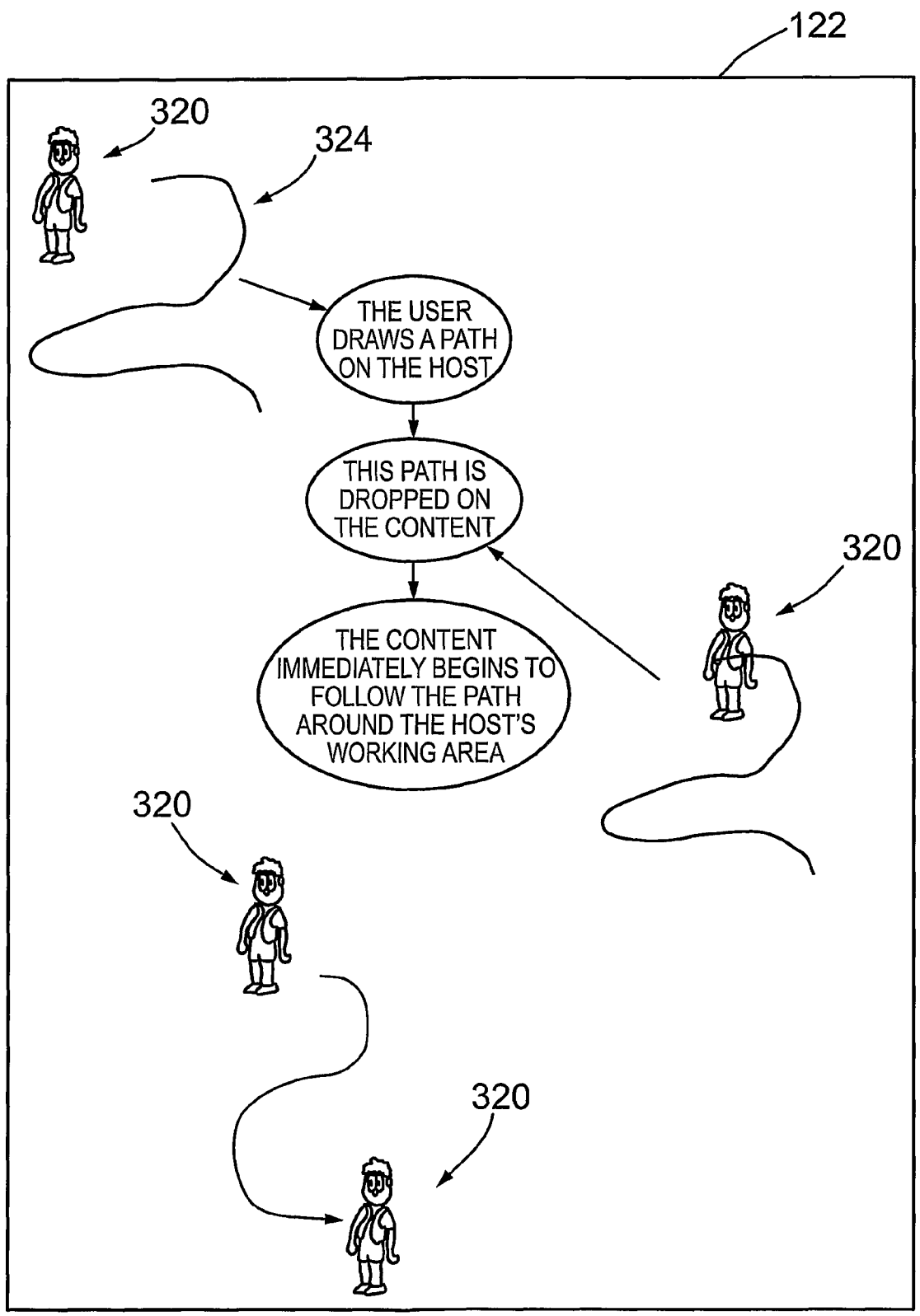
FIG. 6 is another drag and drop content object displayed on the host software application canvas page.

FIG. 6 shows another content object 320 inserted into the host software application and displayed on its page canvas 122. Content object in this example is a path follower graphic in the form of a man having a single component. The routine associated with the component accepts path XML resource objects. When a path XML resource object 324 is dragged from the host software application and dropped onto the content object 320, the host software application stores the resource object file as described previously and the component handler 106 executes the component routine. Upon execution of the component routine, the component handler 106 instructs the host software application to move the main graphic within the canvas page 122 along a path corresponding to that of the dropped path XML resource object. This is achieved by sequentially calling a method to set the location of the content object 320 based on the coordinates of the path XML resource object.

As with the above described content objects, if an unsupported resource object is dragged from the host software application and dropped onto the content object 320, the content object 320 notifies the host software application resulting in the drag and drop event being ignored by the content object 320.

Looped Multiple Path Follower

Figure 7:
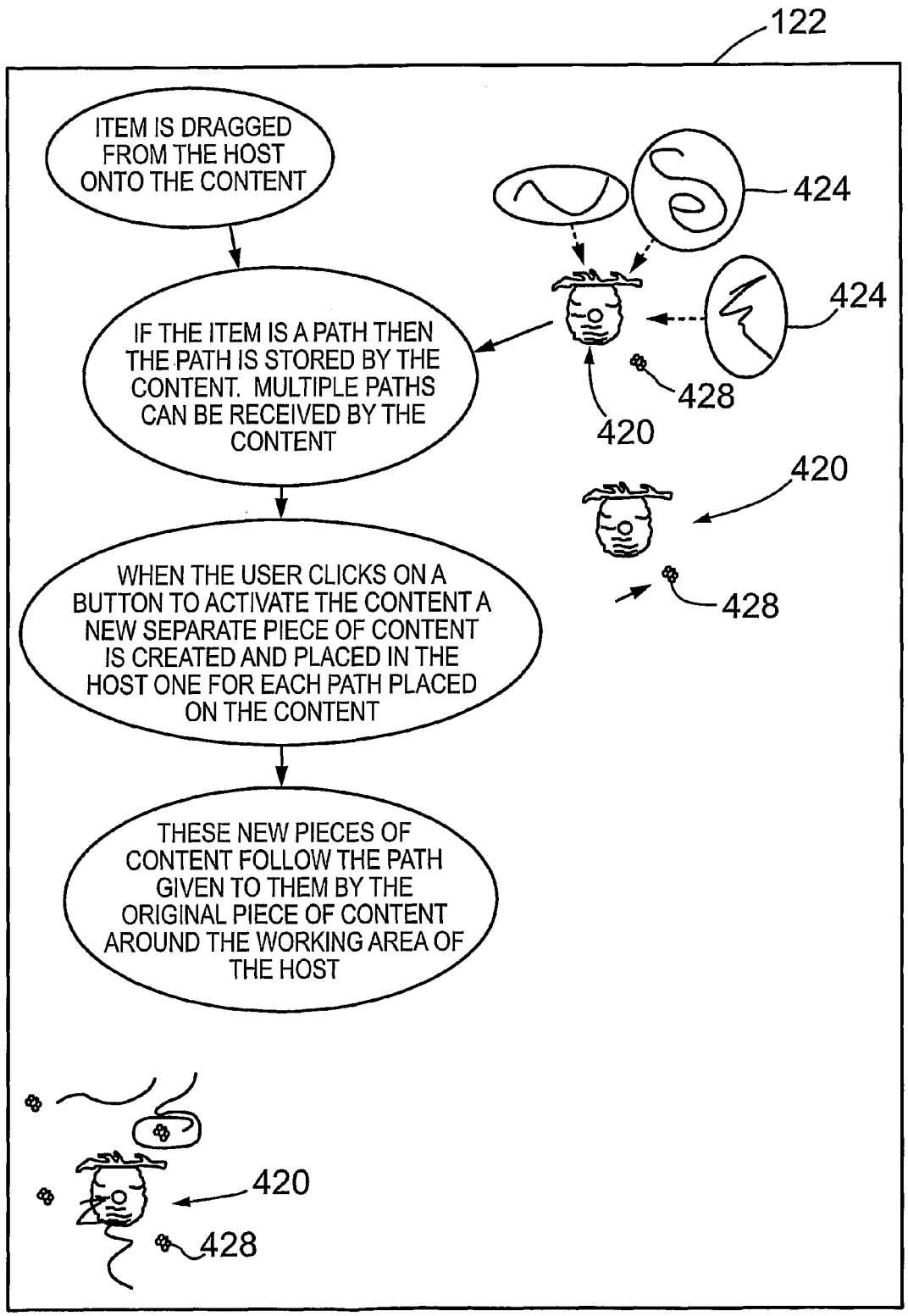
FIG. 7 is yet another drag and drop content object displayed on the host software application canvas page.

FIG. 7 shows another content object 420 inserted into the host software application and displayed on its canvas page 122. Content object 420 in this example is a graphic in the form of a bee hive having a single component. The routine associated with the component accepts path XML resource objects. When a path XML resource object 424 is dragged from the host software application and dropped onto the content object 420, the host software application stores the resource object file as described previously and the component handler 106 executes the component routine. Upon execution of the component routine, a bee graphic 428 is created and installed into the canvas page 122 of the host software application. The appropriate method is also called to move the bee graphic 428 along a path corresponding to that of the dropped path XML resource object in an endless loop. For each path resource object dropped onto the content object 420, a new bee graphic 428 is displayed and moved.

As with the above content objects, if an unsupported resource object is dragged from the host software application and dropped onto the content object 420, the content object 420 notifies the host software application resulting in the drag and drop event being ignored by the content object 420.

Counter Content Object

Figure 8:
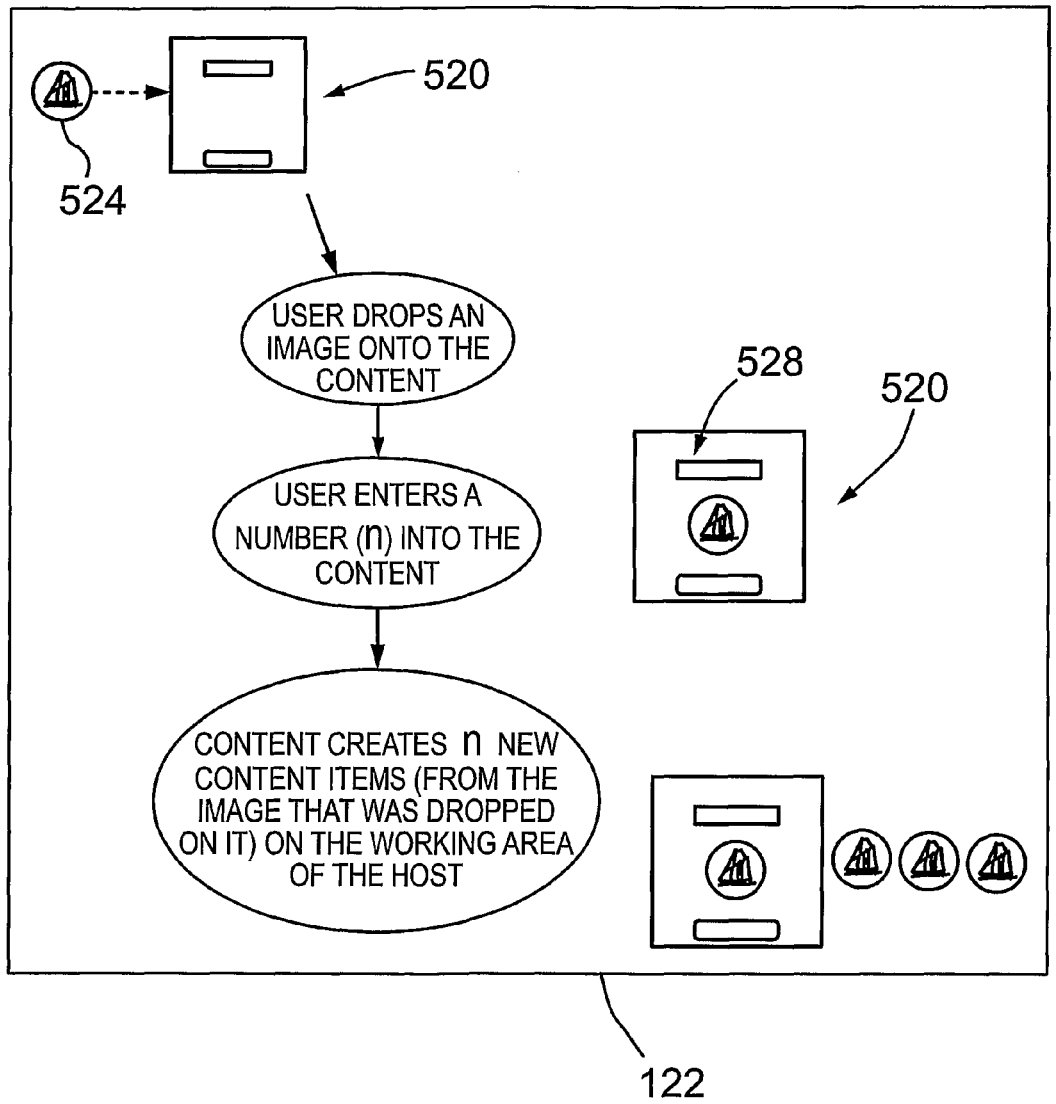
FIG. 8 is yet another drag and drop content object displayed on the host software application canvas page.

FIG. 8 shows another content object 520 inserted into the host software application and displayed on its canvas page 122. Content object 520 in this example is a counter having a number component and a canvas component. The routine associated with the number component accepts numeral text resource objects and numeral ink resource objects. The routine associated with the canvas component accepts graphic resource objects. When a graphic resource object 524 is dragged from the host software application and dropped onto the canvas component, the host software application stores the resource object file as described previously and the resource object is wrapped into the content object and displayed on the canvas component of the counter content object 520. With the resource object displayed on the canvas component, when a text numeral or ink numeral resource object 528 is dragged from the host software application and dropped into the number component, the component handler 106 executes the number component routine. Upon execution of the number component routine, the number component handler 106 copies the resource object 524 into the canvas page 122 of the host software application n times, where n is the value of the numeral resource object inserted into the number component.

As with the above content objects, if an unsupported resource object is dragged from the host software application and dropped onto the content object 520, the content object notifies the host software application resulting in the drag and drop event being ignored by the content object 520.

Image Cropper Content Object

Figure 9:
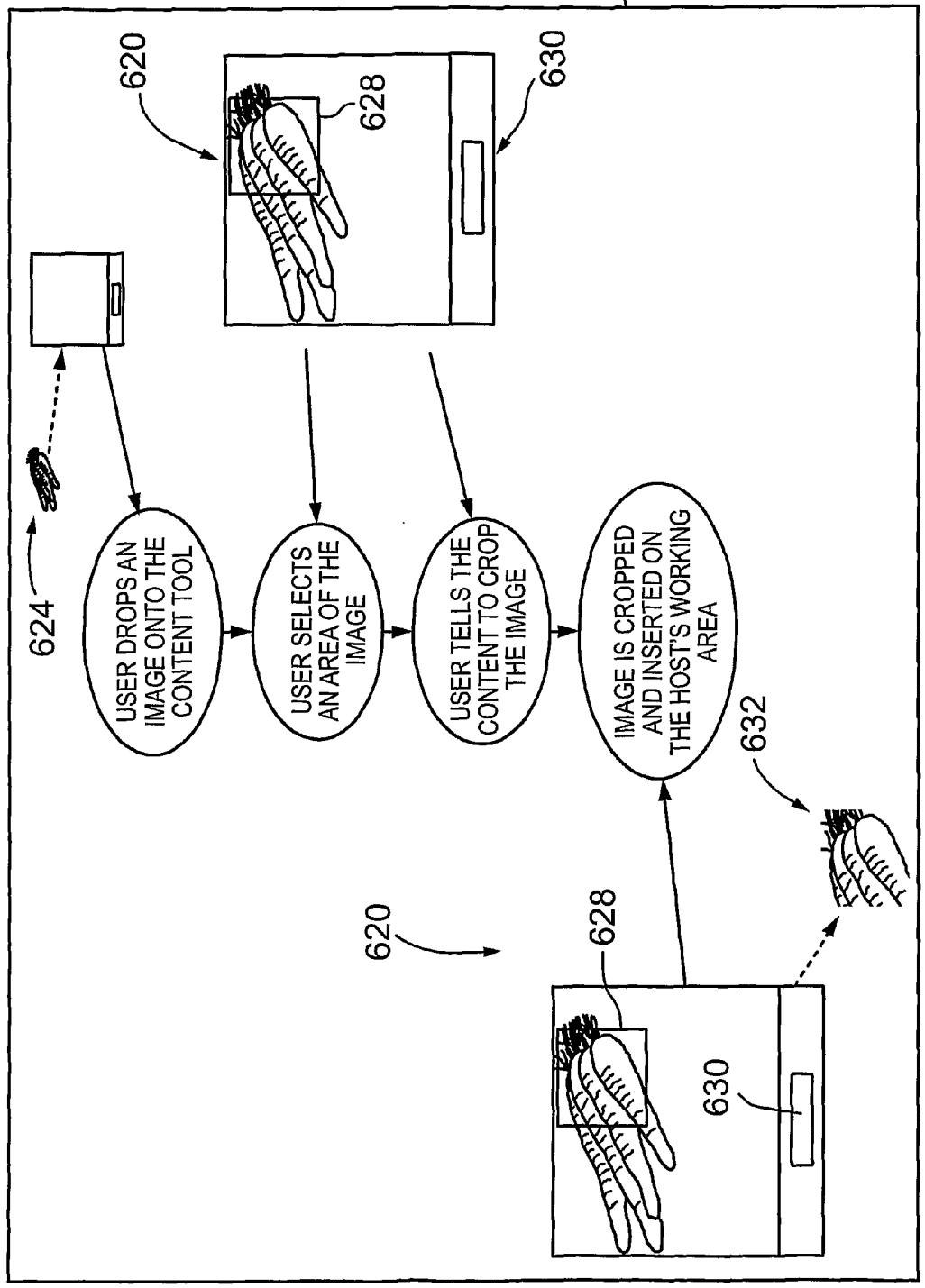
FIG. 9 is still yet another drag and drop content object displayed on the host software application canvas page.

FIG. 9 shows another content object 620 inserted into the host software application and displayed on its canvas page 122. Content object 620 in this example is an image cropper content object having a canvas page component. The routine associated with the canvas page component accepts graphic resource object types. When a graphic resource object 624 is dragged from the host software application and dropped onto the content object 620, the host software application stores the resource object file as described previously and the resource object is wrapped into the content object and displayed on the canvas page component. With the resource object displayed, the user can select an area of the displayed resource object by manipulating a window 628. Once the window is properly positioned, selection of an inject soft button 630 causes the component handler 106 to execute the component routine. Upon execution of the routine, a canvas page location for the portion 632 of the displayed resource object within the window 628 is computed. A copy of the portion 632 displayed within the window is inserted into the canvas page 122 at the computed location.

Similar to the other drag and drop specific content objects, if an unsupported resource object is dragged from the host software application and dropped onto the content object, the content object notifies the host software application resulting in the drag and drop event being ignored by the content object 620.

Cash Register Content Object

Figure 10:
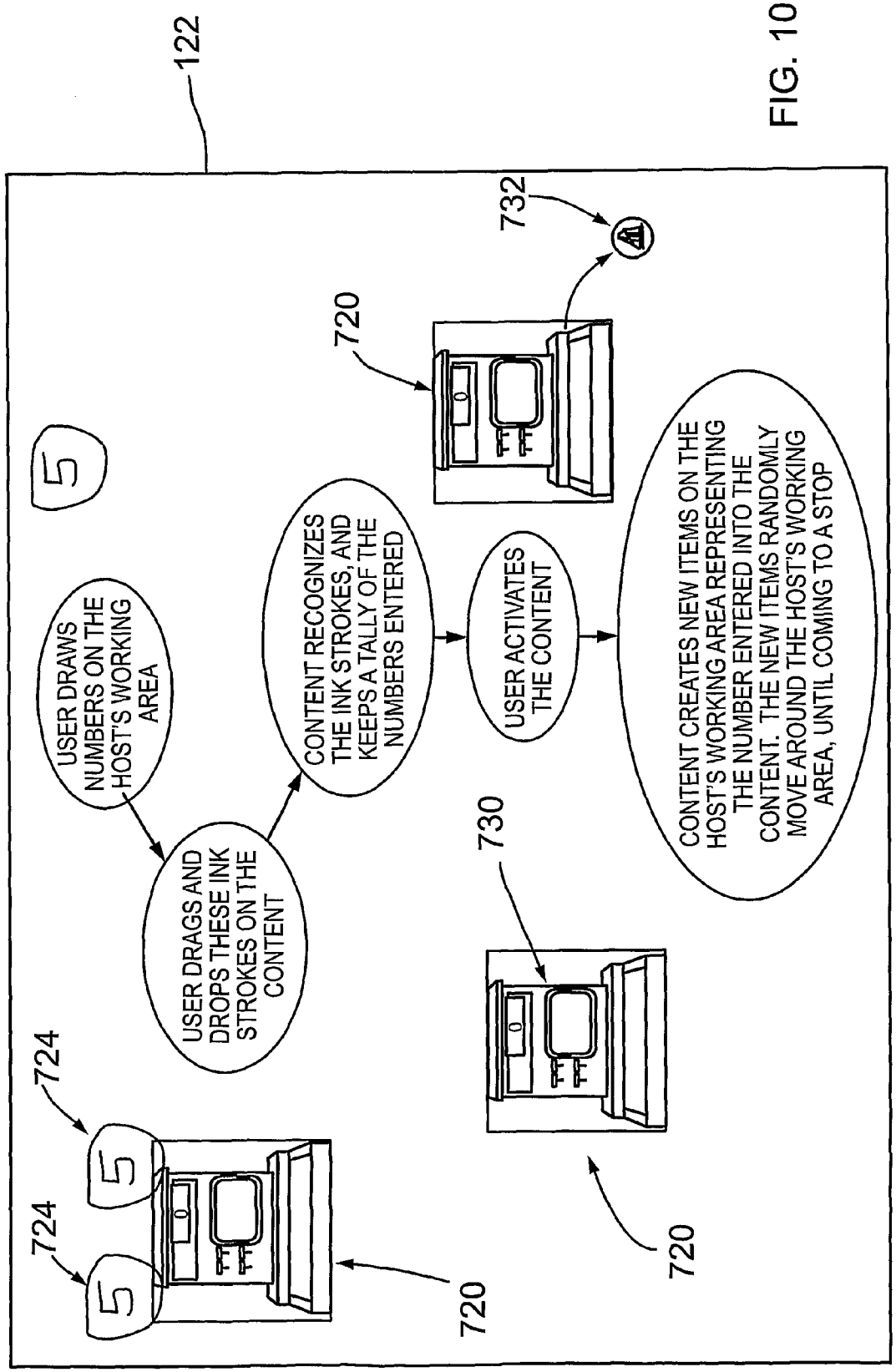
FIG. 10 is still yet another drag and drop content object displayed on the host software application canvas page.

FIG. 10 shows another content object 720 inserted into the host software application and displayed on its canvas page 122. Content object in this example is a cash register having a single component. The routine associated with the component accepts ink numeral resource objects. When an ink numeral resource object 724 is dragged from the host software application and dropped into the cash register content object 720, the host software application stores the resource object file as described previously. The component handler 106 then executes the component routine resulting in the ink being converted into text and the resultant text being wrapped into the content object and displayed by the content object 720. As each ink numeral resource object is dragged from the host software application and dropped onto the cash register content object, the component handler 106 maintains a tally of the entered numbers. When the change soft button 730 on the content object 720 is selected, graphic resource objects 732 resembling coins in the tallied amount are created together with canvas page locations for graphic resource objects. The created graphic resource objects are passed to the component dispatcher 102 which in turn communicates the graphic resource objects to the host software application. Upon receipt of the graphic resource objects, the host software application displays the graphics resource objects on the canvas page 122 and randomly moves the coin graphic resource objects for a predetermined amount of time.

As with the above drag and drop content objects, if an unsupported resource object is dragged from the host software application and dropped onto the content object 720, the content object 720 notifies the host software application resulting in the drag and drop event being ignored.

Treasure Chest

Although not illustrated, the content object may take the form of a treasure chest including a single component that accepts a variety of different resource objects. When a resource object is dragged from the host software application and dropped onto the treasure chest, the host software application saves the resource object file as previously described and notifies the content object. Resource objects dragged and dropped onto the content object are not displayed. When a drag operation starting on the content object is performed followed by a drop event on the canvas page 122 of the host software application, one of the resource objects that had previously been dragged and dropped onto the content object is arbitrarily copied and then inserted into the canvas page 122 of the host software application.

Script Content Object

As mentioned previously, the content object can be programmed to accept a script message that contains script code designed to invoke a type of operation or computation within the content object. The script message uploaded to the content object may change the user interface behavior of the content object or the behavior of graphics within the content object. The script message can be used to change the visual properties, such as for example the background color or transparency of the content object, to change the location of the content object on the canvas page 122, to add functionality to the content object such as for example a new button etc., to add new or change processing capabilities of the content object so that new or different actions are performed in response to interactions with the content object. In this case, the content object comprises a script message handler to handle received script messages. Each script message contains meta information specifying the type of script and the language the script is written in. Upon receipt of a script message, the script message handler of the content object checks the script message to determine if it supports the type of script and if it supports the language that is specified in the script message. In this embodiment, the script message is of an XML structure. An exemplary script message is as follows:

```
<Script type="behavior" language="ActionScript"
    call="movetoandhide(10,10)">
```

```
function move(x, y) {
    this.moveTo(x.y);
}
function setLocation(x, y) {
    this.setLocation(x, y);
}
function hide( ) {
    this._visible = false;
}
Function movetoandhide(x, y) {
    move(x,y);
    hide( );
}
movetoandhide(10,10);
<Script>
```

If the content object supports the script message, the script message handler loads the script message and makes a script message call to execute the script message. In this manner changes to component routines and content object appearance can be made without requiring new content objects to be deployed.

As will be appreciated, by enabling the content object to accept script, the behavior and appearance of the content object can be controlled by inserting script code into the content object at runtime and then executing the script code to change dynamically the behavior of the content object. Uploaded script messages become part of the content object allowing the content of the content object to be dynamically changed after release. As the script messages are executed inside the content object, the behavior of the content object is changed from the inside.

Message Content Object

In addition, the content object can also be programmed to send and receive messages to and from other content objects. In this manner, content objects are able to send messages to content objects signifying the occurrence of specific events. Content objects receiving such messages process the messages resulting in a change in content object style or appearance. In this embodiment, messages are in XML format and comprise data and scripts. The content object comprises a message handler to handle received content object messages and a message transmitter to broadcast messages. When a content object receives a content object message, the message is processed in accordance with the source code routine executed by the message handler and the appropriate operation is performed. This may include for example changing the appearance of the content object or its behavior. The content objects are programmed to accept certain message types. When an incoming content object message is received, the message handler 106 examines the message to determine if it is of a type supported by the content object. If not, the message is ignored. If the content object message is of a type supported by the content object, the message is processed. Messages can be broadcast by a content object to all other content objects displayed on the canvas page 122 of the host software application or can be targeted to a specific content object.

Window Control Content Object

Typically, when content objects are inserted into a host software application, the host software application controls how the content object appears and is manipulated on the canvas page. For example, the host software application typically controls the size of the content object, how the content object is moved, how the content object is deleted, how the window surrounding the content object appears and the transparency colors of the content object. As a result, the content object has no control over its look and feel on the canvas.

To deal with the above, the content object can be provided with a mechanism that allows the content object to control its surrounding window display properties within the canvas page 122 of the host software application and to manipulate its size, location and mode within the canvas page of the host software application. In this manner, the content object can define display properties of its surrounding window such as showing or hiding borders and title bars, setting the title in the bar, setting a transparency color etc. The behavior of the surrounding window can so be defined such as location, size, closing, movement etc. In this case, the content object comprises a library of windowing method calls. In response to interactions with the content object, window parameters in accordance with the windowing method calls are sent to the host software application. In response, the host software application uses the window parameters to update the visual appearance of the window surrounding the content object.

Although the windowing messages are described as being sent to the host software application, those of skill in the art will appreciate that the windowing messages can be sent to the window subsystem in the operating system or to a surrogate application acting on behalf of the operating system.

Canvas Injection Content Object

In addition, the content object can be programmed to create another content object and convey the created content object to the host software application for insertion into the canvas page. The content object computes the visual attributes as well as the behavioral attributes for the created content object so that the created object content has the desired visual appearance and behaves in the appropriate manner on the canvas page. The created content object can comprise graphics resource and text resource object placed in an XML file. The XML file is wrapped in appropriate XML tags making it suitable for insertion into the canvas page 122. Once the created content object is available, the XML file is passed to the host software application in the form of a text document. The host software application in turn parses the XML text to break the XML text into its constituent graphic and text resource objects. The graphic and text resource objects are then saved to a directory by the host software application and inserted into the canvas page.

As will be appreciated, the above examples are provided for illustrative purposes. The components of the content objects may take many forms and be programmed to accept a variety of resource objects and handle i.e. process the accepted resource objects in basically any desired manner. For example, the routines of the components may be programmed to accept resource objects having a specific name or extension. The routines of the components may also be programmed to accept gallery resource objects i.e. resource objects in the form of zip files, each comprising a number of sub-objects, such as for example, animation, audio and text. In the case of gallery resource objects, when a gallery resource object is dragged and dropped into a content object that is programmed to handle the gallery resource object, execution of the appropriate routine by the component handler 106 results in the components of the gallery resource object being unbundled and handled in the programmed manner. As the gallery resource object is wrapped in the content object, if a sub-object of the gallery resource object is dragged out of the content object and dropped onto the canvas page of the host software application, the entire gallery resource object is dragged and dropped out of the content object and not just the selected sub-object component.

As will be appreciated, during creation of the drag and drop content objects, the type(s) of drag and drop input for the content objects such as graphic, text, ink etc. is defined by the content developer together with the manner by which the drag and drop input is to be handled. If resource object handling needs to be changed, new drag and drop content objects can be created by the content developer and deployed. Thus the need to modify application source code to implement content handling changes is avoided.

In order to create content objects that exhibit the functionality described above, or other functionality, a toolkit is provided. The toolkit comprises a component repository storing a list of available content object components and associated routines. Content object components in the component repository can be dragged from the list and dropped onto a content object creation canvas. For example, content object components in the component repository may comprise an infinite cloner that allows a graphic resource object to be copied onto a canvas page, a toolbar container that allows graphic resource objects to be added to a toolbar, a text recognizes that allows text objects to be recognized, a window container that allows a window to surround a content object, a path follower that allows a resource object to follow a drawn line, an animator that allows animated images to be created, a video player that allows video to be played on screen with new functionality etc.

Depending on the functionality to be assigned to the content object being created, various content object components may be grouped on the content object creation canvas to form the content object. When a content object comprising more than one component is being created, the first component dragged from the component repository and dropped onto the content object creation canvas is designated as a container component. The container component is responsible for merging the other components that are to form the content object being created. Once the content object with the desired functionality has been created, the content object is dragged from the content object creation canvas into a content object repository where the created content object is saved. From the content object repository, the content object may be dragged onto the canvas page 122 of the host software application.

If desired, the components in the component repository can be provided with a drop-down property menu that is exposed when the components are first dragged onto the content object creation canvas. Properties in the drop-down properties menu allow the properties for the component to be changed from pre-populated default values. Once changed, the property drop-down menu is hidden inhibiting the properties of the component from being further changed.

Although embodiments have been described, those of skill in the art will appreciate that variations and modifications may be made without departing from the spirit and scope thereof.

What is claimed is:

1. A method of enhancing features in a computing environment comprising a computing device and an interactive surface associated with said computing device, wherein a software application comprising compiled code is executed by said computing device, said method comprising:
   presenting a canvas page of said software application on said interactive surface;
   inserting, via said computing device, at least one content object into the canvas page of said software application and displaying the content object on the canvas page that is presented on said interactive surface, each said content object comprising source code defining functionality attributed to said content object;

executing, via said computing device, said content object source code in response to user-defined interaction with said content object; and creating, via said computing device, each content object by selecting one of more functional components from a component library prior to said inserting, wherein said user-defined interaction comprises a drag and drop of a resource object onto said content object, wherein, prior to execution of said content object source code, the type of said dropped resource object is examined to determine its compatibility with the content object, wherein said attributed functionality comprises functionality that is unavailable in said software application, and wherein during said creating, selected components are dropped onto a content object creation page, the first selected component acting as a container component responsible for merging subsequently selected components forming said content object.

2. The method of claim 1 further comprising:
storing, via said computing device, each created content object in a repository and wherein during said inserting, each said content object is dragged from said repository and dropped onto said canvas page.

3. The method of claim 1 further comprising:
altering, via said computing device, the attributed functionality of said content object subsequent to said inserting.

4. The method of claim 3 wherein said altering comprises:
conveying a message to said content object; and
executing said message to alter said source code.

5. The method of claim 4 wherein said message is a script.

6. The method of claim 1 further comprising:
displaying, via said computing device, the inserted content object on said canvas page within a window.

7. The method of claim 6 further comprising:
altering, via said computing device, the appearance of the window in response to interaction with said content object.

8. The method of claim 1 wherein said content object creates at least one new content object upon execution of said source code, said new content object being inserted into and displayed on said canvas page.

9. The method of claim 1 wherein said content object generates a message to one or more other content objects upon execution of said source code.

10. The method of claim 1 wherein said content object replicates at least a portion of the dropped resource object upon execution of said source code.

11. The method of claim 1 wherein said executed content object source code includes source code that instructs the computing device to execute source code of said software application.

12. A method of adding features to a compiled software application comprising:
creating, via a computing device, one or more content objects, each said content object being insertable into said software application and comprising executable source code defining specified functionality attributed to said content object, wherein each content object is created by selecting one or more functional components from a component library prior to inserting;
inserting, via a computing device, one or more created content objects into said software application and displaying the inserted content objects on an associated interactive surface; and
interacting, via a computing device, with one or more of the inserted created content objects displayed on the interactive surface to invoke the specified functionality thereof within the software application,
wherein the interacting comprises dragging and dropping a resource object onto one or more of the inserted created content objects, wherein, prior to invoking the specified functionality of the one or more of the inserted created content objects, the type of the dropped resource object is examined to determine its compatibility with the one or more of the inserted created content objects, wherein said attributed functionality comprises functionality that is unavailable in said software application, and wherein during said creating, selected components are dropped onto a content object creation page, the first selected component acting as a container component responsible for merging subsequently selected components forming said content object.

13. The method of claim 12 wherein said specified functionality is changeable after said inserting.

14. The method of claim 12 further comprising:
storing, via a computing device, each created content object in a repository and wherein during said inserting, each said content object is dragged from said repository and dropped into said software application.

15. The method of claim 12 further comprising:
displaying, via a computing device, the inserted content object within a window.

16. The method of claim 15 further comprising:
altering, via a computing device, the appearance of the window in response to interaction with said content object.

17. The method of claim 1 wherein execution of said source code moves a graphic associated with the resource object along a path.

18. The method of claim 17 wherein the path is an endless loop.

19. An interactive input system comprising:
an interactive surface on which a graphical user interface is presented, said interactive surface being responsive to touch input and outputting data in response to touch input made thereon; and
a computing device associated with and communicating with the interactive surface and receiving data therefrom, said computing device at least executing a software application comprising compiled code and being configured to:
insert at least one content object into a canvas page of the graphical user interface presented on said interactive surface for display, each said content object comprising source code defining functionality assigned to said content object;
execute said content object source code in response to user touch interaction with the displayed content object thereby to invoke the defined functionality assigned to the content object and supplement software application functionality with said assigned functionality;
creating, via said computing device, each content object by selecting one or more functional components from a component library prior to the inserting, and
update the graphical user interface presented on the interactive surface in response to execution of the content object source code,
wherein the user touch interaction comprises a drag and drop of a resource object onto the inserted content object, wherein, prior to invoking the defined functionality of the inserted content object, the type of the dropped resource object is examined to determine its compatibility with the inserted content object wherein the assigned functionality comprises functionality that is unavailable in said software application, and wherein during the creating, selected components are dropped onto a content object creation page, the first selected component acting as a container component responsible for merging subsequently selected components forming said content object.

20. The interactive input system of claim 19 wherein the computing device is further configured to:

store each created content object in a repository and wherein the computing device inserts into the canvas page, each content object that is dragged from said repository and dropped onto said canvas page.

21. The interactive input system of claim 19 wherein the computing device is further configured to:

alter the assigned functionality of said content object subsequent to said inserting.

22. The interactive input system of claim 21 wherein during the altering, the computing device is configured to:

convey a message to said content object; and execute said message to alter said source code.

23. The interactive input system of claim 22 wherein said message is a script.

24. The interactive input system of claim 19 wherein the computing device is further configured to:

display the inserted content object on said canvas page within a window.

25. The interactive input system of claim 24 wherein the computing device is further configured to:

alter the appearance of the window in response to user interaction with said content object.

26. The interactive input system of claim 19 wherein said content object creates at least one new content object upon execution of said source code, said new content object being inserted into said canvas page.

27. The interactive input system of claim 19 wherein said content object generates a message to one or more other content objects upon execution of said source code.

28. The interactive input system of claim 19 wherein said content object replicates at least a portion of the dropped resource object upon execution of said source code.

29. The interactive input system of claim 19 wherein the computing device is further configured to move a graphic associated with the resource object along a path in response to execution of said source code.

30. The interactive input system of claim 29 wherein the path is an endless loop.

* * * * *